C. CRAMMER.
EXPANSIBLE TOOLS FOR CUTTING HOLES OF DIFFERENT SIZES.
No. 170,527.                                   Patented Nov. 30, 1875.
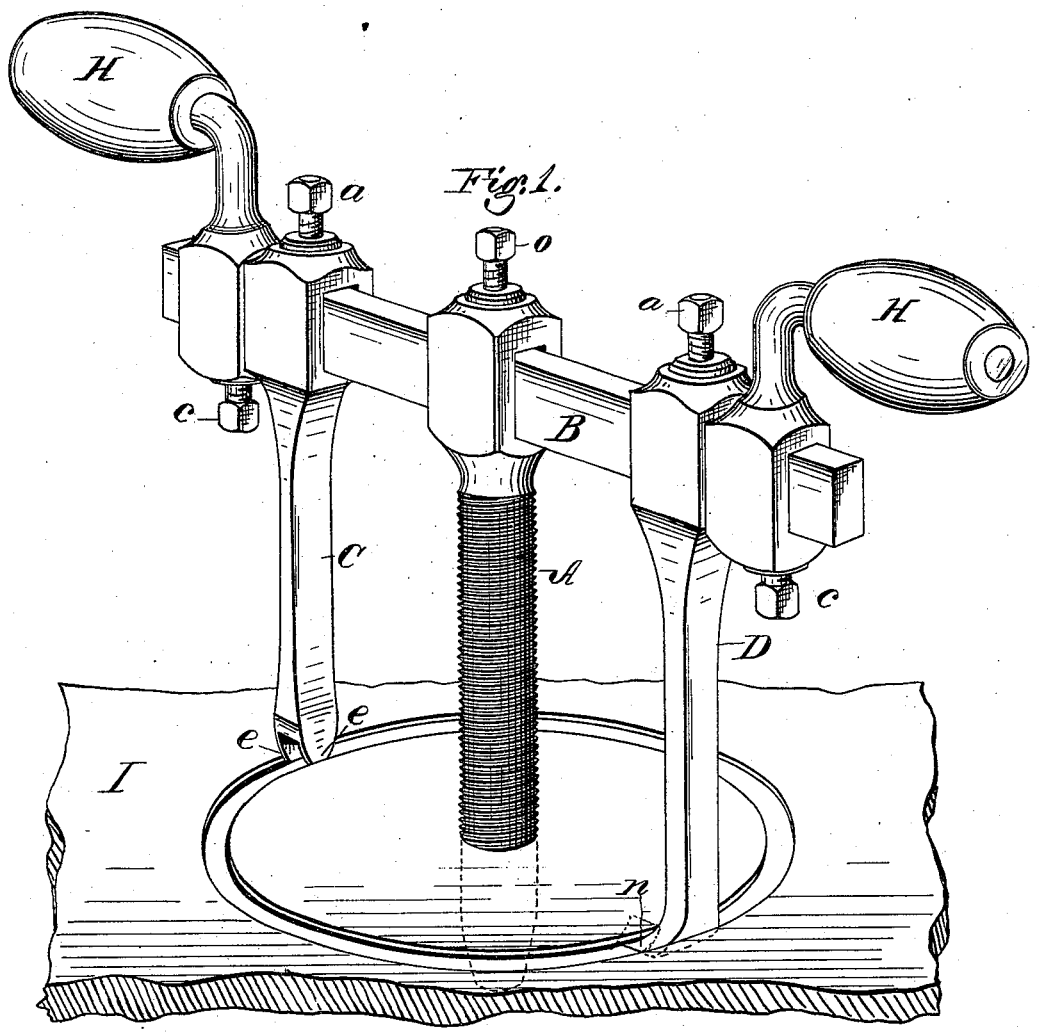
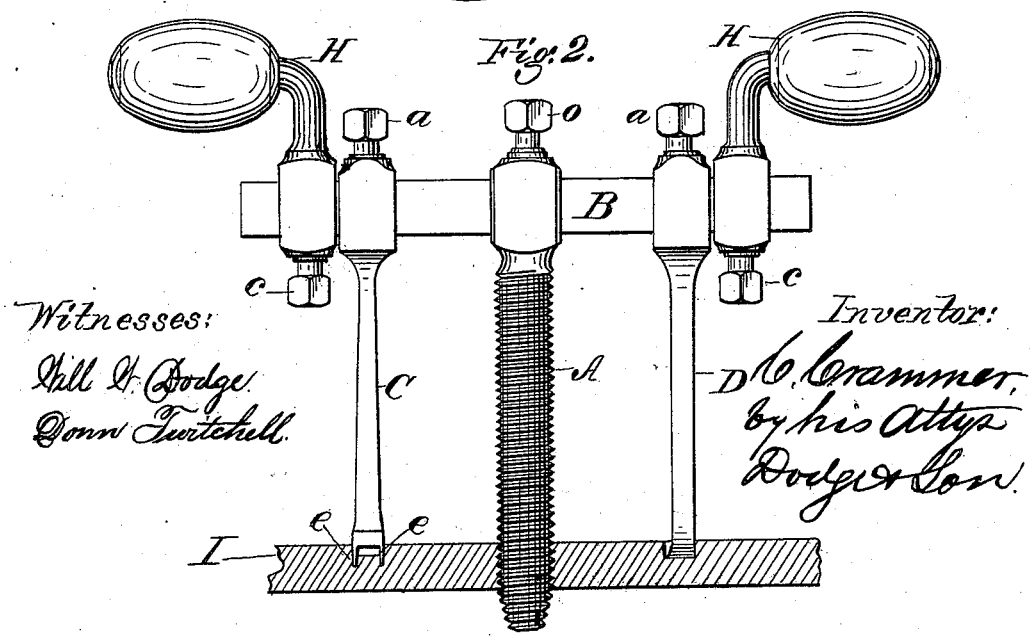

UNITED STATES PATENT OFFICE.

CHRISTOPHER CRAMMER, OF TURNER'S FALLS, MASSACHUSETTS.

IMPROVEMENT IN EXPANSIBLE TOOLS FOR CUTTING HOLES OF DIFFERENT SIZES.

Specification forming part of Letters Patent No. 170,527, dated November 30, 1875; application filed September 9, 1875.

*To all whom it may concern:*

Be it known that I, CHRISTOPHER CRAMMER, of Turner's Falls, in the county of Franklin and State of Massachusetts, have invented certain Improvements in Expansible Tools for Cutting Holes of Different Sizes, of which the following is a specification:

My invention consists of a central screw-stem, having a transverse bar attached to its upper end, on which are secured two adjustable cutters, and also two adjustable handles, the whole constituting a tool for cutting circular holes of various sizes in wood, as hereinafter more fully explained.

Figure 1 is a perspective view of my improved tool, in use. Fig. 2 is a front elevation of the same.

It is often desirable to cut holes of several inches or a foot or more in diameter through floors, ceilings, partitions, and elsewhere, for putting up pipes, shafting, &c.; and the object of my invention is to produce a suitable and convenient tool to be used for such purposes, and one that can be so adjusted as to cut holes of various sizes.

To make such a tool, I provide a central bolt or stem, A, on which is cut a screw-thread, and which has its end somewhat tapered, as shown in Fig. 2. Through the upper end of this stem A, I make a transverse slot, and fit therein loosely a bar, B, which may be fastened at any desired point by a set-screw, o, in the head of the stem A, as shown in Figs. 1 and 2. I then provide a cutter, C, which has on its free end two thin vertical cutting-lips, e e, as represented in Figs. 1 and 2, it being secured at its opposite end to the cross-bar B by a mortise, through which the bar enters, as shown in Fig. 1, there being a set-screw, a, to clamp it fast at any desired point on the bar. Upon the opposite end of the bar B, I mount in the same manner another cutter, D, which is provided at its free end with a projecting curved cutting-point, n, as shown in Fig. 1, this point operating like a plane-bit or a chisel to cut loose and throw out the wood, the sides of which have been previously cut by the points e e of the cutter C. Upon the cross-bar B I then mount two adjustable handles, H, constructed as shown in Figs. 1 and 2, and which are provided with set-screws c for fastening them in place.

The manner of using the tool is as follows: A hole is first bored with a bit or auger of the proper size for the central stem A to screw into—this hole, of course being bored at the center of the large hole to be cut. The taper end of the stem B is inserted in the bit or auger-hole, when, by turning the tool by its handles H, the screw on the stem A feeds it in to its work. As it is turned, the lips e cut a thin groove in the wood I, and the cutter n, following behind, planes or plows out the chip thus cut at its edges, thereby forming a continuous channel, as shown in Fig. 1—this channel, of course, growing deeper at each turn of the cutters, until, finally, the board or article is cut through, thus cutting out a circular piece or block, and leaving a smooth, round hole of the desired size, according as the cutters were set.

By making these parts detachable, as shown, they may be adjusted as desired, and the cutting-tools C D may be removed for sharpening or repairing, and others may be substituted when desired.

It is also obvious that, instead of making the cutting-lips e and n on separate bars, they may be all made on, or attached to, one bar; but I prefer the plan shown, as it is easier to make the cutting-lips separately than together, and because, also, the tool is better balanced when they are arranged at opposite sides, and it works better.

By means of such a tool, holes can be readily and easily cut, of any desired size, much smoother and better than with the small saw ordinarily used for such purposes. They can also be cut through beams, or in solid thick masses of boards or planking, where a saw cannot be used to advantage. It is specially useful in piping a building, putting up shafting, cutting holes for stove-pipes, and, indeed, in all cases where it is desired to cut a round hole of three or more inches in diameter.

I am aware that expansible bits of various styles have been constructed for use with bit-stocks, and in a machine for cutting out barrel heads; and, also, that a hand-cutter has been made, with adjustable cutters, with a point to screw into the wood, and in which the cross-head worked up and down on a screw, and, therefore, I do not claim either of these; but, Having described my invention, what I claim is—

The herein-described tool for cutting circular holes of various sizes, the same consisting of the bar B, having the screw-stem A, cutters C D, and handles H, adjustably secured thereto, substantially as shown.

CHRISTOPHER CRAMMER.

Witnesses:
W. D. RUSSELL,
PORTER FARWELL.